June 25, 1929.  G. L. BLOMQUIST  1,718,848

BALL BEARING

Filed Oct. 24, 1927

Inventor:
Guy L. Blomquist

Patented June 25, 1929.

1,718,848

UNITED STATES PATENT OFFICE.

GUY L. BLOMQUIST, OF CLEVELAND, OHIO, ASSIGNOR TO MARLIN-ROCKWELL CORPORATION, OF CHICAGO, ILLINOIS, A CORPORATION OF NEW YORK.

BALL BEARING.

Application filed October 24, 1927. Serial No. 228,324.

This invention relates to ball bearings.

An object of this invention is to provide a ball bearing which is particularly adapted for very high speed service such as is included in centrifugal separators, high speed motors and the like.

This and other objects, as will hereinafter appear, are accomplished by this invention which is fully described in the following specification and shown in the accompanying drawings, in which.

Figure 1:
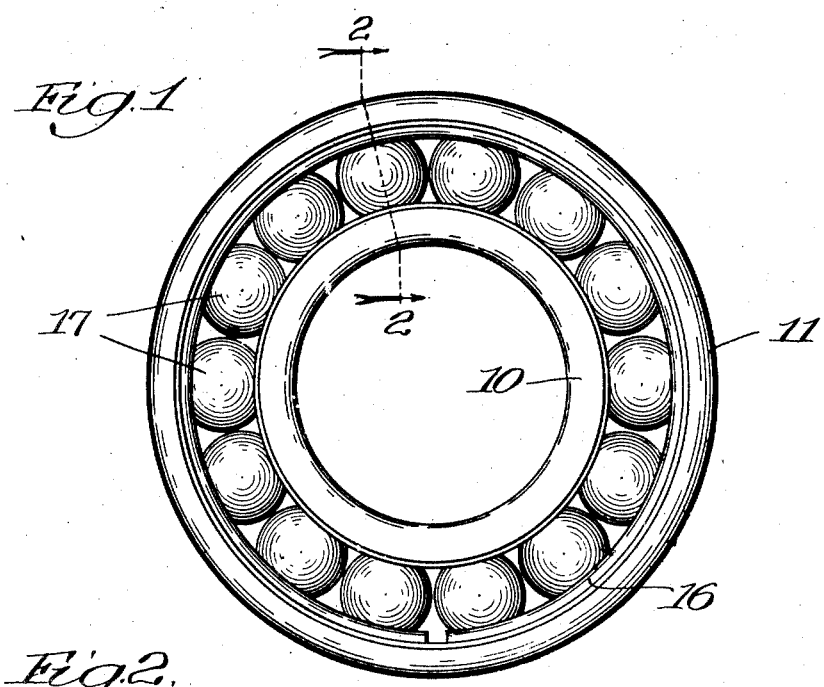
Figure 1 is a front elevation of a bearing embodying this invention.
Figure 2:
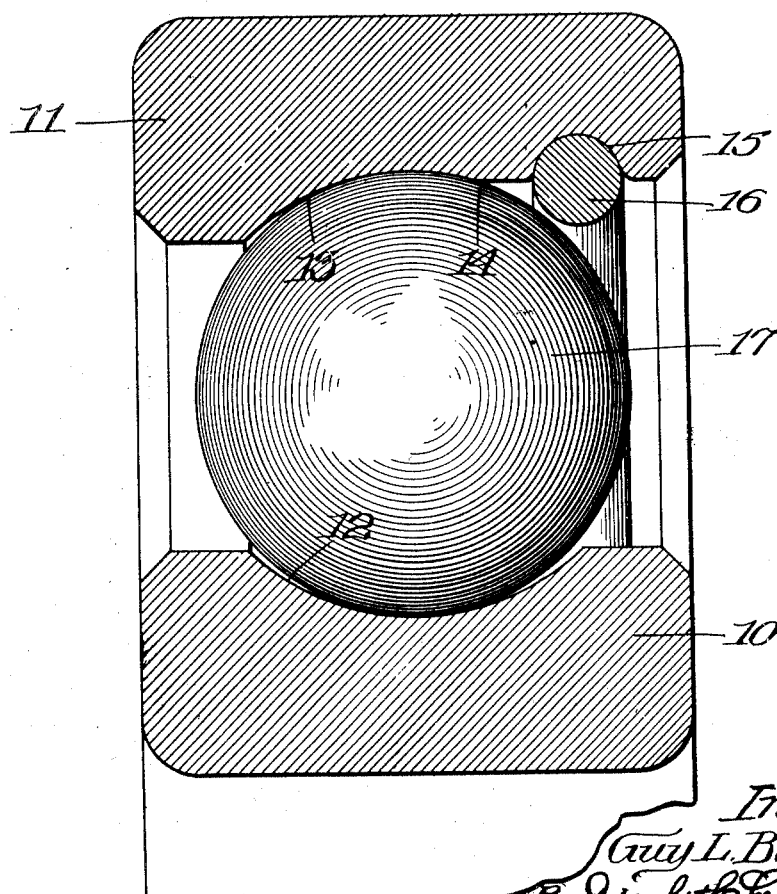
Fig. 2 is an enlarged sectional view on the line 2—2 of Fig. 1.

The embodiment illustrated comprises a ball bearing having inner and outer race members 10 and 11 which have facing ball races 12 and 13 respectively therein.

This bearing is of the type adapted to take radial and combined radial and thrust loads.

I have found by experience that for very high speed work ball bearings cannot be used which employ ball spacers or retainers. Where no ball retainers are used and the balls are properly spaced, centrifugal force seems to throw a ring of oil around each ball and to keep it properly spaced from the adjacent balls so that very slight friction occurs between the balls themselves.

In order to assemble such a bearing in which there is very slight clearance between the adjacent balls in the bearing, it is necessary either to use a filling slot or else to make one side of the outer ball race very shallow in order that that ball race may be expanded by heat sufficiently to let it pass over the balls after which the shrinkage on cooling will cause the race to be retained upon the balls.

With such a bearing it is very dangerous to use filling slots for the reason that a little wear may cause the entrance to the filling slot to become worn thereby enabling the balls to work out through the slot while the bearing is moving. Also where only a shallow line or ledge is used around one side of the groove as where the assembling is done by heating the outer race member, a little wear of the outer race member alone or combined with any undue heating of this member may cause the balls to be released particularly under the strained condition under which such a bearing frequently operates.

In the present bearing I have employed a shallow ledge 14 on one side of the outer race member which is just sufficient to enable the balls to enter when the outer race member is heated while the inner race member is chilled. To overcome the danger of such a bearing becoming disassembled after wear has occurred or where it is operating under unusual heat conditions, I have provided an annular notch or groove 15 within the outer race member and within this is snapped a snap-ring 16 which is placed as close to the balls 17 as may conveniently be the case.

Thus, it will be seen, that a ball bearing is produced which is suitable for very high speed work and which at the same time provides the safety feature of other forms of ball bearings.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a ball bearing, inner and outer race-members, balls located in the race-ways in said members, one of said race-members having a shallow rim at one side of its race-way adapted, when expanded, to permit assembling of said members with said balls interposed therebetween and upon contraction to provide a dam holding said members and balls from becoming disassembled, and means in addition to said rim and out of contact with said balls in both the normal loaded and unloaded position of the bearing, for preventing separation of the parts of the bearing.

2. In a ball bearing, inner and outer race-members, balls located in the race-ways in said members, one of said race-members having a shallow rim at one side of its race-way adapted, when expanded, to permit assembling of said members with said balls interposed therebetween and upon contraction to provide a dam holding said members and balls from becoming disassembled, said rim containing an annular groove at a side of said groove, and a snap-ring in said groove out of contact with said balls in both the loaded and unloaded condition of said bearing and serving as a safety means for preventing separation of said race members.

3. In a high speed ball-bearing, inner and outer race-members, a full set of balls located in the race-ways in said members, the rim at one side of one of said race-members being sufficiently shallow to permit assembling of said members with said balls interposed therebetween when there is a large increase in temperature in the outer one of said race-members over that in the inner one of said race-members, whereby the race members and balls will be retained at ordinary temperatures, said outer race-member containing an annular groove located beyond said rim portion, and a snap ring in said groove out of contact with said balls in both the loaded and unloaded condition of said bearing and serving as a safety means for preventing separation of said race members.

4. In a radial ball member, inner and outer race-members containing facing ball race-ways, balls located in the race-ways in said members, one of said race-members having a shallow rim at one side of its race-way, adapted when expanded, to permit assembling of said members with said balls interposed therebetween and upon contraction to provide a dam holding said members and balls from becoming disassembled, and means in addition to said rim and out of contact with said balls in both the normal loaded and unloaded position of the bearing, for preventing separation of the parts of the bearing.

5. In a radial ball-bearing, inner and outer race-members containing facing ball race-ways, balls located in the race-ways in said members, one of said race-members having a shallow rim at one side of its race-way, adapted when expanded, to permit assembling of said members with said balls interposed therebetween and upon contraction to provide a dam holding said members and balls from becoming disassembled, said rim containing an annular groove at a side of said groove, and a snap-ring in said groove out of contact with said balls in both the loaded and unloaded condition of said bearing and serving as a safety means for preventing separation of said race members.

6. In a radial ball-bearing, inner and outer race-members containing facing ball race-ways, a full set of balls located in the race-ways in said members, the rim at one side of one of said race members being sufficiently shallow to permit assembling of said members with said balls interposed therebetween when there is a large increase in temperature in the outer one of said race-members over that in the inner one of said race members, whereby the race members and balls will be retained at ordinary temperatures, said outer race-member containing an annular groove located beyond said rim portion, and a snap ring in said groove out of contact with said balls in both the loaded and unloaded condition of said bearing and serving as a safety means for preventing separation of said race members.

In testimony whereof I have hereunto set my hand and seal this 10th day of October, 1927.

GUY L. BLOMQUIST.